United States Patent
Matsubara et al.

(10) Patent No.: US 8,311,039 B2
(45) Date of Patent: Nov. 13, 2012

(54) TRAFFIC INFORMATION AGGREGATING APPARATUS

(75) Inventors: Daisuke Matsubara, Kodaira (JP); Yasushi Fukuda, Fujisawa (JP); Satoshi Kiyoto, Fujisawa (JP); Tomohiro Baba, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 626 days.

(21) Appl. No.: 11/492,904

(22) Filed: Jul. 26, 2006

(65) Prior Publication Data

US 2007/0201359 A1 Aug. 30, 2007

(30) Foreign Application Priority Data

Feb. 27, 2006 (JP) ................. 2006-050154

(51) Int. Cl.
*H04L 12/28* (2006.01)
(52) U.S. Cl. .......... 370/389; 370/229; 709/223
(58) Field of Classification Search .......... 370/389, 370/392, 235, 252, 229–231, 236, 241, 401; 709/203, 223
See application file for complete search history.

(56) References Cited

U.S. PATENT DOCUMENTS

| | | | | |
|---|---|---|---|---|
| 6,650,640 | B1 * | 11/2003 | Muller et al. ........ | 370/392 |
| 7,243,143 | B1 * | 7/2007 | Bullard ............ | 709/223 |
| 2003/0081546 | A1 * | 5/2003 | Agrawal et al. ........ | 370/229 |
| 2005/0276230 | A1 * | 12/2005 | Akahane et al. ........ | 370/252 |
| 2006/0168265 | A1 * | 7/2006 | Bare et al. .......... | 709/230 |
| 2007/0113284 | A1 * | 5/2007 | O'Rourke et al. ........ | 726/23 |
| 2007/0124158 | A1 * | 5/2007 | Kakuta et al. ........ | 705/1 |

FOREIGN PATENT DOCUMENTS

JP 2006-5402 1/2006

OTHER PUBLICATIONS

Dressler, et al. IPFIX Aggregation<draft-dressler-ipfix-aggregation-02,txt>, http://ietf.cnri.reston.va.us/internet-drafts/draft-dressler-ipfix-aggregation-02.txt.

Kobayashi, et al. The Reference Model of IPFIX concentrators draft-Kobayashi-ipfi-concentrator-model-01.txt., Sep. 2006, http://ring.nict.go.jp/archives/doc/RFC/internet-drafts/draft-kobayashi-ipfix-co.

Kobayashi, et al. Managed Objects for IPFIX concentrator draft-kobayashi-ipfix-concentrator-mib-01.txt., Sep. 2006, http://www.ietf.org/internet-drafts/draft-kobayashi-ipfix-concentrator-mib-01.txt.

* cited by examiner

*Primary Examiner* — Dang Ton
*Assistant Examiner* — Mandish Randhawa
(74) *Attorney, Agent, or Firm* — Mattingly & Malur, PC (57) ABSTRACT

Provided is a network system including a traffic information aggregating apparatus connected to a router for transferring data in a network, and a monitor server connected to the traffic information aggregating apparatus. In the network system, the traffic information aggregating apparatus receives traffic information from the router, assigns an aggregation identifier to the received traffic information, creates aggregated information by aggregating the traffic information based on the assigned aggregation identifier and by statistically processing the traffic information, transmits the created aggregated information and the assigned aggregation identifier to the monitor server, and retrieves, upon reception of a retrieval request including the aggregation identifier from the monitor server, requested traffic information from the received traffic information, based on the aggregation identifier included in the received retrieval request. Accordingly, an amount of data received by the monitor server can be reduced.

12 Claims, 9 Drawing Sheets

| RECORD_ID | IPV4_SRC_ADDR | IPV4_DST_ADDR | IN_BYTES | AGGR_ID |
|---|---|---|---|---|
| 1 | 192.168.1.1 | 192.168.1.2 | 64 | 1 |
| 2 | 192.168.1.1 | 192.168.1.2 | 128 | 1 |
| 3 | 192.168.1.3 | 192.168.1.4 | 64 | 2 |
| 4 | 192.168.1.1 | 192.168.1.2 | 256 | 1 |
| 5 | 192.168.1.3 | 192.168.1.4 | 128 | 2 |
| ⋮ | ⋮ | ⋮ | ⋮ | ⋮ |

AGGREGATION CONDITION
<AGGR_KEY> IPV4_SRC_ADDR, IPV4_DST_ADDR </AGGR_KEY>
<AGGR_VALUE> IN_BYTES </AGGR_VALUE>
<AGGR_ID> sequential <AGGR_ID>

■AGGREGATED INFORMATION
<IPV4_SRC_ADDR> 192.168.1.1 </IPV4_SRC_ADDR>
<IPV4_DST_ADDR> 192.168.1.2 </IPV4_DST_ADDR>
<IN_BYTES> 448 </IN_BYTES>
<AGGR_ID> 1 </AGGR_ID>

FIG. 7

■QUERY REQUEST
SELECT IPV4_SRC_ADDR, IPV4_DST_ADDR, IN_BYTES FROM flow WHERE AGGR_ID=1

FIG. 8

■ QUERY RESULT
<RECORD_ID> 1 </RECORD_ID>
<IPV4_SRC_ADDR> 192.168.1.1 </IPV4_SRC_ADDR>
<IPV4_DST_ADDR> 192.168.1.2 </IPV4_DST_ADDR>
<IN_BYTES> 64 </IN_BYTES>
<RECORD_ID> 2 </RECORD_ID>
<IPV4_SRC_ADDR> 192.168.1.1 </IPV4_SRC_ADDR>
<IPV4_DST_ADDR> 192.168.1.2 </IPV4_DST_ADDR>
<IN_BYTES> 128 </IN_BYTES>
<RECORD_ID> 4 </RECORD_ID>
<IPV4_SRC_ADDR> 192.168.1.1 </IPV4_SRC_ADDR>
<IPV4_DST_ADDR> 192.168.1.2 </IPV4_DST_ADDR>
<IN_BYTES> 256 </IN_BYTES>

FIG. 9

■AGGREGATION CONDITION
<AGGR_KEY> IPV4_DST_ADDR, L4_DST_PORT </AGGR_KEY>
<AGGR_VALUE> IN_PKTS </AGGR_VALUE>
<AGGR_ID> IPV4_DST_ADDR, L4_DST_PORT <AGGR_ID>

*FIG. 10*

| RECORD_ID | IPV4_DST_ADDR | L4_DST_PORT | IN_PKTS | AGGR_ID |
|---|---|---|---|---|
| 1 | 192.168.1.1 | 20 | 10 | 192.168.1.1, 20 |
| 2 | 192.168.1.1 | 20 | 2 | 192.168.1.1, 20 |
| 3 | 192.168.1.3 | 80 | 5 | 192.168.1.3, 80 |
| 4 | 192.168.1.1 | 20 | 3 | 192.168.1.1, 20 |
| 5 | 192.168.1.3 | 80 | 12 | 192.168.1.3, 80 |
| ⋮ | ⋮ | ⋮ | ⋮ | ⋮ |

■AGGREGATED INFORMATION
<IPV4_DST_ADDR> 192.168.1.1 </IPV4_DST_ADDR>
<L4_DST_PORT> 20 </L4_DST_PORT>
<IN_PKTS> 15 </IN_PKTS>
<AGGR_ID> 192.168.1.1, 20 </AGGR_ID>

*FIG. 13*

■QUERY REQUEST
SELECT IN_PKTS FROM flow WHERE AGGR_ID=192.168.1.1, 20

*FIG. 14*

■QUERY RESULT
<RECORD_ID> 1 </RECORD_ID>
<IN_PKTS> 10 </IN_PKTS>
<RECORD_ID> 2 </RECORD_ID>
<IN_PKTS> 2 </IN_PKTS>
<RECORD_ID> 4 </RECORD_ID>
<IN_PKTS> 3 </IN_PKTS>

*FIG. 15*

TRAFFIC INFORMATION AGGREGATING APPARATUS

CLAIM OF PRIORITY

The present application claims priority from Japanese patent application JP2006-50154 filed on Feb. 27, 2006, the content of which is hereby incorporated by reference into this application.

BACKGROUND OF THE INVENTION

This invention relates to a network system including a traffic information aggregating apparatus and a monitor server, and more particularly to a technique of aggregating traffic information.

A conventional traffic information monitoring system includes a router, a traffic information aggregating apparatus, and a monitor server. The traffic information aggregating apparatus is connected to the router. The monitor server is connected to the traffic information aggregating apparatus.

The router transmits traffic information to the traffic information aggregating apparatus. The traffic information aggregating apparatus receives the traffic information from the router and stores the received traffic information in the form of a file. Upon traffic information request from the monitor server, the traffic information aggregating apparatus transmits a file of requested traffic information to the monitor server.

It should be noted that the traffic information aggregation is disclosed in Internet Draft of IPFIX Aggregation by Dressler et al, dated Dec. 20, 2005.

SUMMARY OF THE INVENTION

In the conventional traffic information monitoring system, the monitor server receives traffic information on a file basis. In other words, the monitor server cannot receive only a specific piece of traffic information. Thus, a large amount of data is received by the monitor server, which causes a problem in system extensibility of a large scale network when the conventional traffic information monitoring system is used.

This invention has been made in view of the above-mentioned problem, and therefore an object of this invention is to provide a network system in which an amount of data to be received by a monitor server is reduced.

According to an exemplary embodiment of this invention, there is provided a network system, comprising: a router for transferring data in a network; a traffic information aggregating apparatus connected to the router, the traffic information aggregating apparatus comprising: a first processor; a first memory; and a first interface; and a monitor server connected to the traffic information aggregating apparatus, the monitor server comprising: a second processor; a second memory; and a second interface, wherein the traffic information aggregating apparatus receives traffic information from the router, assigns an aggregation identifier to the received traffic information, creates aggregated information by aggregating the received traffic information based on the assigned aggregation identifier, transmits the created aggregated information and the assigned aggregation identifier to the monitor server, and retrieves, upon reception of a retrieval request including the aggregation identifier from the monitor server, requested traffic information from the received traffic information, based on the aggregation identifier included in the received retrieval request.

According to the representative embodiment of this invention, the amount of data to be received by the monitor server can be reduced.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, embodiments of this invention will be described with reference to the accompanying drawings.

First Embodiment

Figure 1:
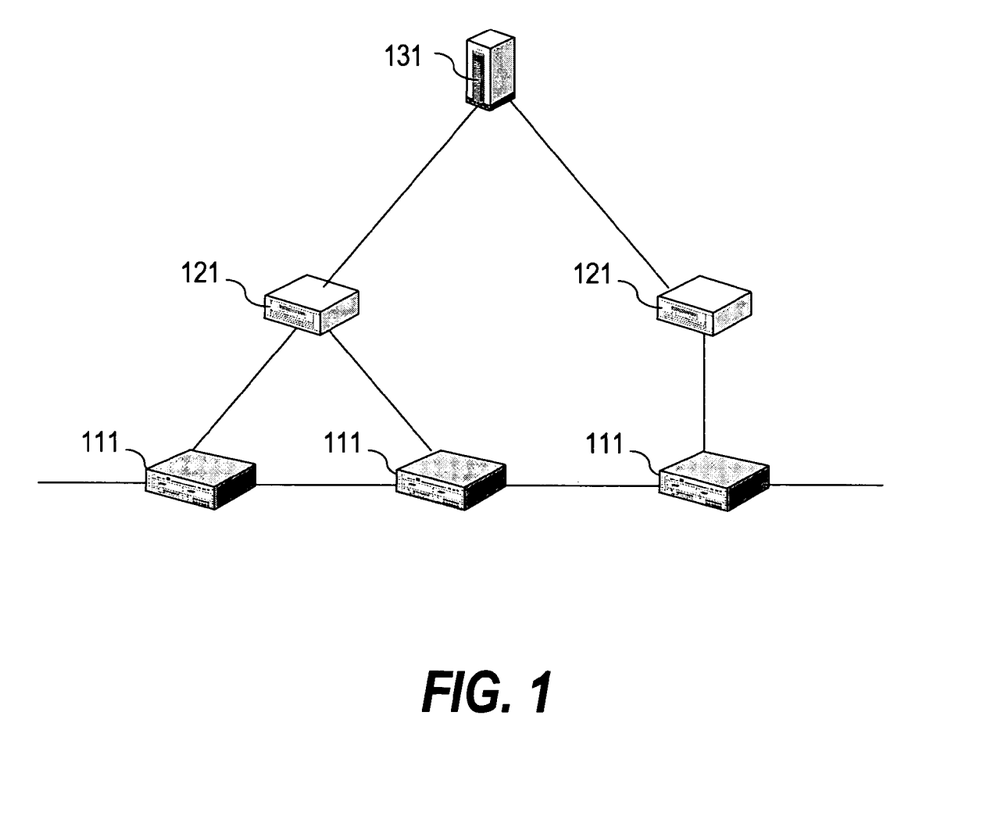
FIG. 1 is a block diagram of a configuration of a traffic information monitoring system according to a first embodiment of this invention.

FIG. 1 is a block diagram of a configuration of a traffic information monitoring system according to a first embodiment of this invention.

The traffic information monitoring system includes a router 111, a traffic information aggregating apparatus 121, and a monitor server 131. The traffic information aggregating apparatus 121 is connected to one or more routers 111. The monitor server 131 is connected to one or more traffic information aggregating apparatuses 121.

The router 111 connects different networks to one another. In other words, the router 111 transfers data on a network, and transmits traffic information to the traffic information aggregating apparatus 121.

The traffic information aggregating apparatus 121 aggregates traffic information transmitted from the router 111. Details of the traffic information aggregating apparatus 121 will be described with reference to FIG. 2. The monitor server 131 is a computer including a CPU, a memory, and an interface.

It should be noted that the router 111 and the traffic information aggregating apparatus 121 may be included in the same enclosure. Further, the monitor server 131 and the traffic information aggregating apparatus 121 may be included in the same enclosure.

Next, a description is given of an outline of processing of the traffic information monitoring system.

The router 111 transmits traffic information to the traffic information aggregating apparatus 121 connected thereto. The traffic information includes NetFlow data or sFlow data.

The traffic information aggregating apparatus 121 receives the traffic information from the router 111. Next, the traffic information aggregating apparatus 121 stores the received traffic information as a file.

The traffic information aggregating apparatus 121 creates aggregated information by aggregating stored traffic information. It should be noted that the aggregated information is statistical information on the traffic information.

Then, the traffic information aggregating apparatus 121 transmits the created aggregated information to the monitor server 131 by using a protocol such as NetFlow.

On the other hand, the monitor server 131 transmits a query request to the traffic information aggregating apparatus 121. Upon reception of the query request from the monitor server 131, the traffic information aggregating apparatus 121 retrieves traffic information corresponding to the query request from the stored traffic information, and transmits the retrieved traffic information to the monitor server 131.

Figure 2:
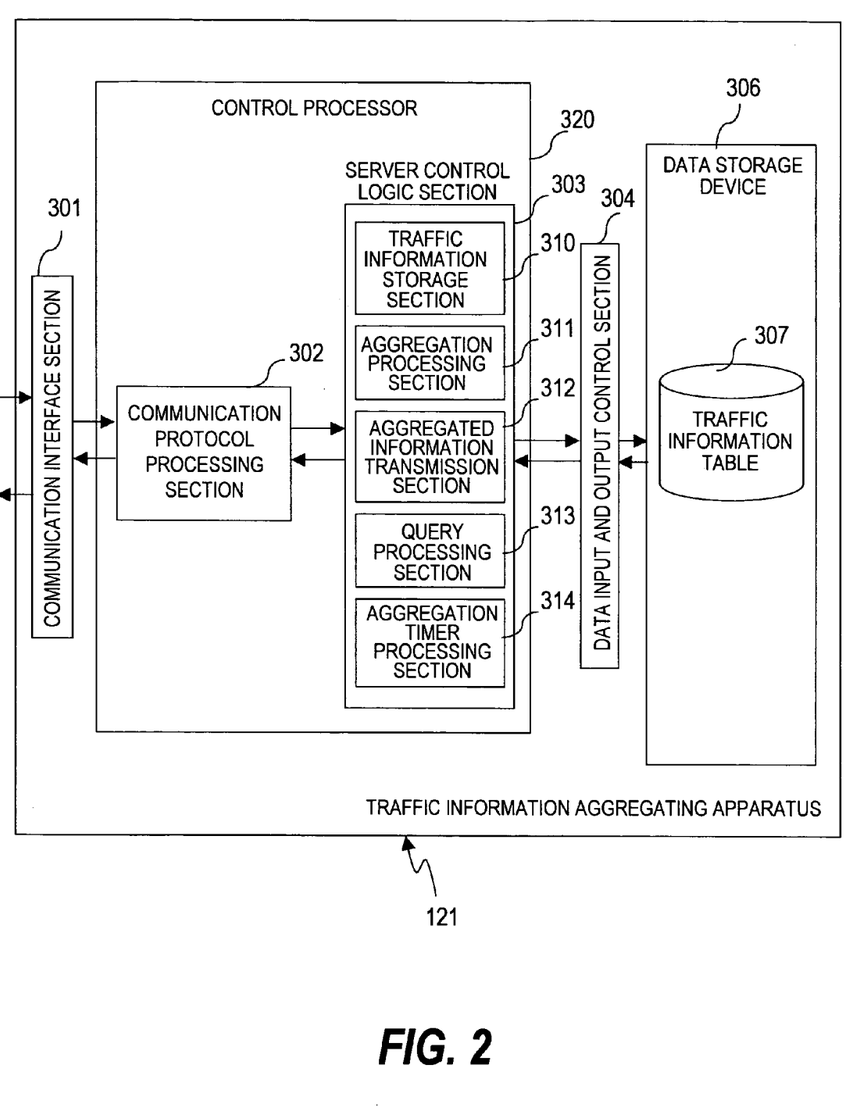
FIG. 2 is a block diagram of a configuration of the traffic information aggregating apparatus according to the first embodiment of this invention.

FIG. 2 is a block diagram of a configuration of the traffic information aggregating apparatus 121 according to the first embodiment of this invention.

The traffic information aggregating apparatus 121 includes a communication interface section 301, a control processor 320, a data input and output control section 304, a data storage device 306, an administrator input and output section (not shown), and a memory (not shown).

The communication interface section 301 is connected to the router 111 and to the monitor server 131.

The data storage device 306 stores various information, specifically, in a traffic information table 307. The traffic information table 307 has traffic information transmitted from the router 111. Details of the traffic information table 307 will be described with reference to FIG. 3.

The data input and output control section 304 controls input and output of data with respect to the data storage device 306.

Information is inputted by an administrator through the administrator input and output section, and various information is outputted from the administrator input and output section. The administrator input and output section includes a display and a keyboard, for example.

The control processor 320 executes a program stored in the memory to realize a communication protocol processing section 302 and a server control logic section 303. The memory stores the program executed by the control processor 320 and information required by the control processor 320.

The communication protocol processing section 302 deals with communication protocols. To be specific, the communication protocol processing section 302 converts data mutually between a protocol used within the traffic information aggregating apparatus 121 and a protocol used outside the traffic information aggregating apparatus 121.

The server control logic section 303 includes a traffic information storage section 310, an aggregation processing section 311, an aggregated information transmission section 312, a query processing section 313, and an aggregation timer processing section 314.

The traffic information storage section 310 receives traffic information from the router 111, and stores the received traffic information in the traffic information table 307.

The aggregation processing section 311 creates aggregated information by aggregating the traffic information stored in the traffic information table 307.

The aggregated information transmission section 312 transmits the aggregated information created by the aggregation processing section 311 to the monitor server 131.

The query processing section 313 receives a query request from the monitor server 131. The query processing section 313 retrieves traffic information corresponding to the received query request, from the traffic information table 307. Then, the query processing section 313 transmits the retrieved traffic information to the monitor server 131 as a query result.

The aggregation timer processing section 314 provides the aggregation processing section 311 with a timer for aggregation. With use of the timer, the aggregation processing section 311 creates aggregated information by aggregating traffic information received in a predetermined period of time.

Figure 3:
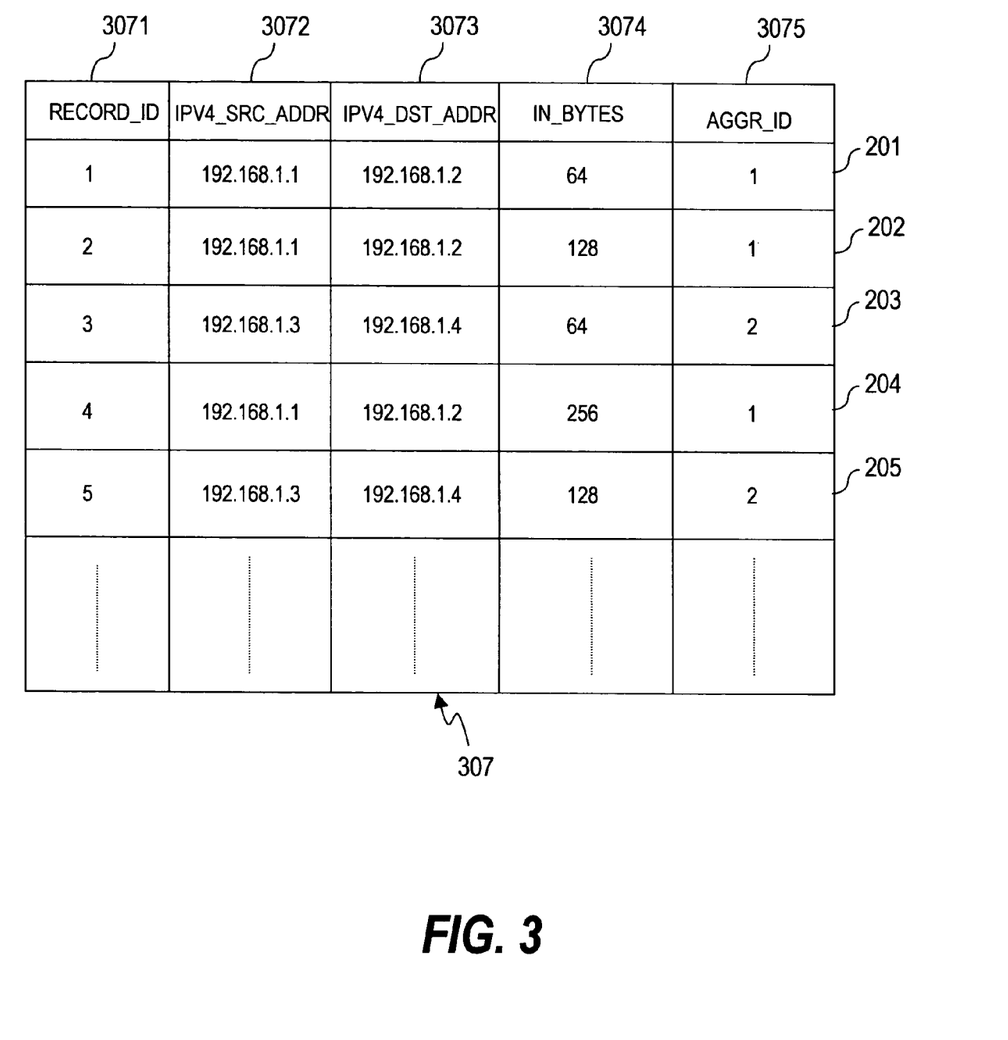
FIG. 3 is a configuration diagram of the traffic information table according to the first embodiment of this invention.

FIG. 3 is a configuration diagram of the traffic information table 307 according to the first embodiment of this invention.

The traffic information table 307 contains a traffic information identifier (RECORD_ID) 3071, a source IP address (IPV4_SRC_ADDR) 3072, a destination IP address (IPV4_DST_ADDR) 3073, a byte count (IN_BYTES) 3074, and an aggregation identifier (AGGR_ID) 3075.

The traffic information identifier 3071 is a unique identifier of each piece of traffic information. The source IP address 3072 is an IP address of the source of the communication flow corresponding to the traffic information identified by the traffic information identifier 3071 of the record. The destination IP address 3073 is an IP address of the destination of the communication flow corresponding to the traffic information identified by the traffic information identifier 3071 of the record.

The byte count 3074 is a byte count of data transmitted in the communication flow corresponding to the traffic information identified by the traffic information identifier 3071 of the record. The aggregation identifier 3075 is a unique identifier of aggregated information corresponding to the traffic information identified by the traffic information identifier 3071 of the record. The aggregation identifier 3075 is used when the traffic information aggregating apparatus 121 aggregates traffic information, and is also used when the traffic information aggregating apparatus 121 retrieves traffic information.

Figure 4:
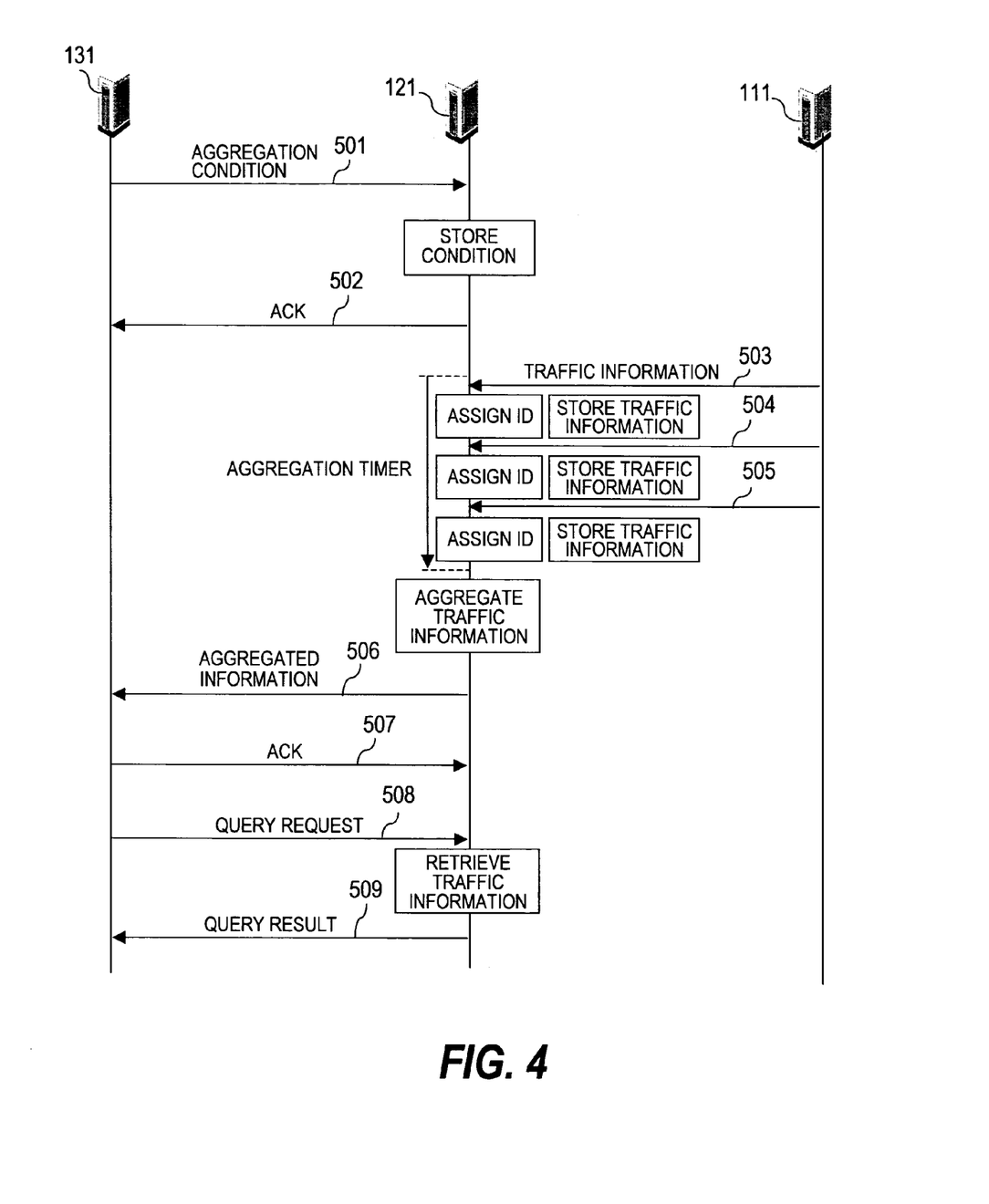
FIG. 4 is a sequence diagram of processing of the traffic information monitoring system according to the first embodiment of this invention.

FIG. 4 is a sequence diagram of processing of the traffic information monitoring system according to the first embodiment of this invention.

First, the monitor server 131 transmits an aggregation condition to the traffic information aggregating apparatus 121 (501).

The aggregation condition is a condition under which the traffic information aggregating apparatus 121 aggregates traffic information. To be specific, transmitted as the aggregation condition is a source IP address, a destination IP address, a source port number, a destination port number, a prefix of a source IP address, a prefix of a destination IP address, an autonomous system (AS), a protocol number, or a type of service (ToS). Alternatively, a combination of the above-mentioned items may be transmitted as the aggregation condition. Details of the aggregation condition will be described with reference to FIG. 5.

The traffic information aggregating apparatus 121 receives the aggregation condition from the monitor server 131, and stores the received aggregation condition in the memory provided for the traffic information aggregating apparatus 121. Then, the traffic information aggregating apparatus 121 transmits an arrival acknowledge packet (ACK) to the monitor server 131 (502).

On the other hand, the router 111 transmits traffic information to the traffic information aggregating apparatus 121.

The traffic information aggregating apparatus 121 receives the traffic information (503, 504, and 505). The traffic information aggregating apparatus 121 then stores the received traffic information in the traffic information table 307.

To be specific, the traffic information aggregating apparatus 121 assigns a traffic information identifier to each piece of the received traffic information, and further assigns an aggregation identifier to each piece of the received traffic information based on the aggregation condition stored in the memory.

Next, the traffic information aggregating apparatus 121 creates a new record in the traffic information table 307. Then, the traffic information aggregating apparatus 121 stores the assigned traffic information identifier in the traffic information identifier 3071 of the new record. The traffic information aggregating apparatus 121 stores the assigned aggregation identifier in the aggregation identifier 3075 of the new record.

Then, the traffic information aggregating apparatus 121 stores the IP address of the source of the communication flow corresponding to the received traffic information, in the source IP address 3072 of the new record, stores the IP address of the destination of the communication flow corresponding to the received traffic information, in the destination IP address 3073 of the new record, and stores the byte count of data in the communication flow corresponding to the received traffic information, in the byte count 3074 of the new record.

As described above, the traffic information aggregating apparatus 121 stores the received traffic information in the traffic information table 307.

Next, the traffic information aggregating apparatus 121 aggregates traffic information stored in the traffic information table 307. It should be noted that the traffic information aggregating apparatus 121 aggregates traffic information received in a predetermined period of time. The predetermined period of time is measured by the aggregation timer processing section 314.

To be specific, the traffic information aggregating apparatus 121 creates aggregated information by aggregating traffic information having the same aggregation identifier 3075 of the traffic information table 307. Details of aggregation processing performed by the traffic information aggregating apparatus 121 will be described with reference to FIG. 6.

Next, the traffic information aggregating apparatus 121 transmits the created aggregated information to the monitor server 131 (506). The aggregated information of this embodiment includes the aggregation identifier. Details of the aggregated information will be described with reference to FIG. 7.

When receiving the aggregated information from the traffic information aggregating apparatus 121, the monitor server 131 transmits ACK to the traffic information aggregating apparatus 121 (507).

After that, the monitor server 131 transmits a query request to the traffic information aggregating apparatus 121 (508). The query request of this embodiment includes the aggregation identifier. Details of the query request will be described with reference to FIG. 8.

When receiving the query request from the monitor server 131, the traffic information aggregating apparatus 121 retrieves traffic information corresponding to the query request, from the traffic information table 307 based on the aggregation identifier contained in the query request.

Then, the traffic information aggregating apparatus 121 transmits the retrieved traffic information to the monitor server 131 as a query result (509). Details of the query result will be described with reference to FIG. 9.

Figure 5:
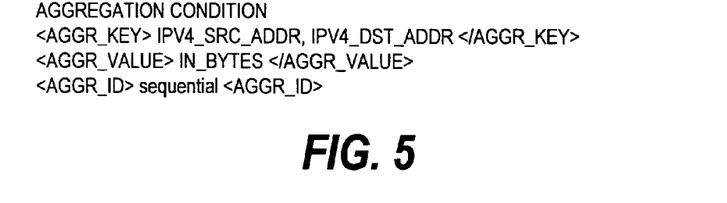
FIG. 5 is an explanatory diagram of an aggregation condition transmitted by the monitor server according to the first embodiment of this invention.

FIG. 5 is an explanatory diagram of an aggregation condition transmitted by the monitor server 131 according to the first embodiment of this invention.

The aggregation condition includes an aggregation key (AGGR_KEY), a value to be aggregated (AGGR_VALUE), and a type of an aggregation identifier (AGGR_ID_TYPE).

The traffic information aggregating apparatus 121 creates aggregated information by aggregating traffic information having the same value of the aggregation key. The value to be aggregated is one of the values contained in the traffic information, and is aggregated by the traffic information aggregating apparatus 121.

The type of an aggregation identifier is a type of an identifier to be assigned to aggregated information.

In the aggregation condition of FIG. 5, the aggregation key is a combination of a source IP address (IPV4_SRC_ADDR) and a destination IP address (IPV4_DST_ADDR), and the value to be aggregated is the byte count of data in a communication flow (IN_BYTES).

The type of an aggregation identifier is sequential. In this case, the traffic information aggregating apparatus 121 assigns aggregation identifiers in ascending order.

After receiving the aggregation condition shown in FIG. 5, the traffic information aggregating apparatus 121 stores traffic information in the traffic information table 307 shown in FIG. 3 based on the received aggregation condition.

Figure 6:
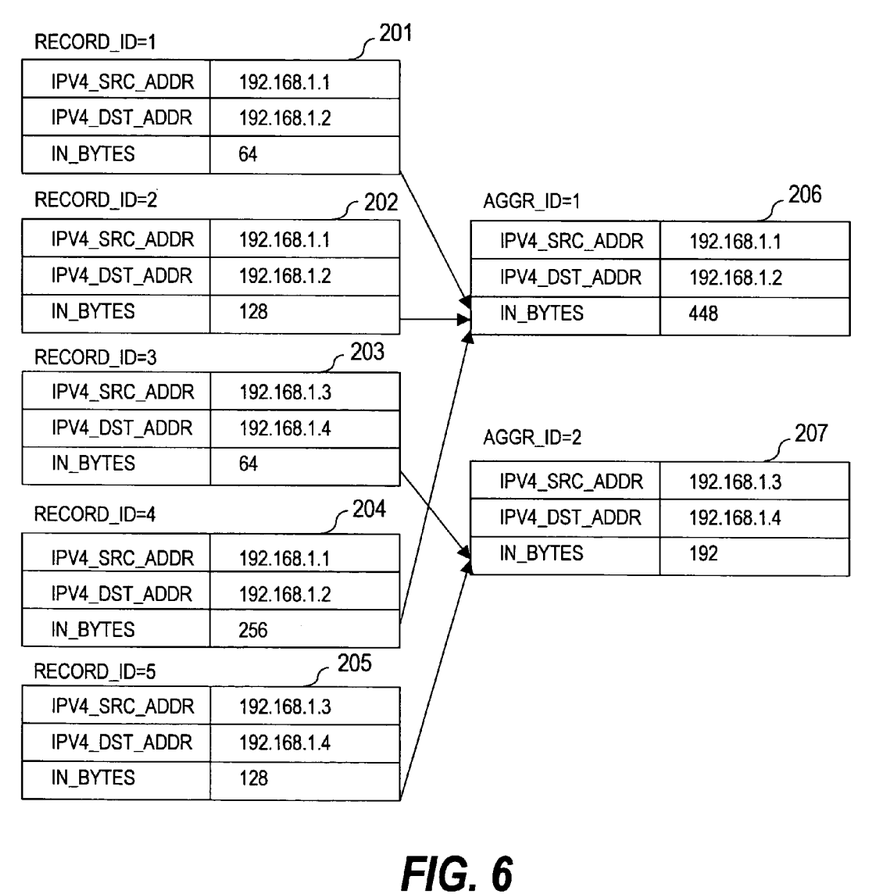
FIG. 6 is an explanatory diagram of aggregation processing performed by the traffic information aggregating apparatus according to the first embodiment of this invention.

FIG. 6 is an explanatory diagram of aggregation processing performed by the traffic information aggregating apparatus 121 according to the first embodiment of this invention.

A description is given of a case of the aggregation condition shown in FIG. 5.

The traffic information aggregating apparatus 121 aggregates traffic information on communication flows that have the same combination of a source IP address and a destination IP address.

To be specific, the traffic information aggregating apparatus 121 selects records that have the same combination of the source IP address 3072 and the destination IP address 3073 of the traffic information table 307 shown in FIG. 3. The traffic information aggregating apparatus 121 assigns an identical aggregation identifier to the traffic information corresponding to the chosen records. The traffic information aggregating apparatus 121 creates aggregated information by aggregating the traffic information to which the identical aggregation identifier is assigned.

For example, the traffic information aggregating apparatus 121 selects, from the traffic information table 307 shown in FIG. 3, a record 201 identified by "1" of the traffic information identifier 3071, a record 202 identified by "2" of the traffic information identifier 3071, and a record 204 identified by "4" of the traffic information identifier 3071, because the traffic information corresponding to the records 201, 202, and 204 have the same combination of the source IP address 3072 and the destination IP address 3073.

The traffic information aggregating apparatus 121 assigns "1" as an aggregation identifier to the traffic information corresponding to the record 201, the traffic information corresponding to the record 202, and the traffic information corresponding to the record 204. The traffic information aggregating apparatus 121 stores the assigned aggregation identifier "1" in the aggregation identifiers 3075 of the records 201, 202, and 204.

The traffic information aggregating apparatus 121 creates aggregated information 206 by calculating the total of the byte counts 3074 of all the chosen records 201, 202, and 204.

In a similar manner, the traffic information aggregating apparatus 121 selects, from the traffic information table 307, a record 203 identified by "3" of the traffic information identifier 3071 and a record 205 identified by "5" of the traffic information identifier 3071, because the traffic information corresponding to the records 203 and 205 have the same combination of the source IP address 3072 and the destination IP address 3073.

The traffic information aggregating apparatus 121 assigns "2" as an aggregation identifier to the traffic information corresponding to the record 203 and the traffic information corresponding to the record 205. The traffic information aggregating apparatus 121 stores the assigned aggregation identifier "2" in the aggregation identifiers 3075 of the records 203 and 205.

The traffic information aggregating apparatus 121 creates aggregated information 207 by calculating the total of the byte counts 3074 of all the chosen records 203 and 205.

Figure 7:
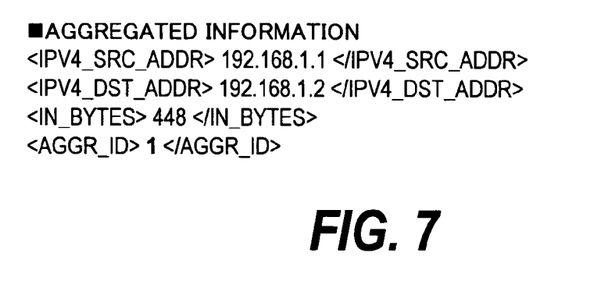
FIG. 7 is an explanatory diagram of aggregated information transmitted by the traffic information aggregating apparatus according to the first embodiment of this invention.

FIG. 7 is an explanatory diagram of aggregated information transmitted by the traffic information aggregating apparatus 121 according to the first embodiment of this invention.

The aggregated information includes a source IP address (IPV4_SRC_ADDR), a destination IP address (IPV4_DST_ADDR), the total of byte counts in the communication flows (IN_BYTES), and an aggregation identifier (AGGR_ID).

The source IP address included in the aggregated information is the IP address of the source of the communication flow corresponding to the aggregated information. The destination IP address included in the aggregated information is the IP address of the destination of the communication flow corresponding to the aggregated information. The total of byte counts included in the aggregated information is the total of byte counts of data transmitted in the communication flows corresponding to the aggregated information. The aggregation identifier is a unique identifier of the aggregated information.

In the aggregated information of FIG. 7, the source IP address is "192.168.1.1", and the destination IP address is "192.168.1.2". The total of byte counts in the communication flows is "448" bytes, and the aggregation identifier is "1".

Figure 8:
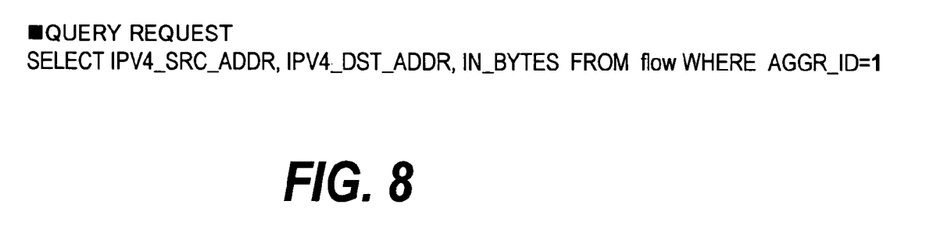
FIG. 8 is an explanatory diagram of a query request transmitted by the monitor server according to the first embodiment of this invention.

FIG. 8 is an explanatory diagram of a query request transmitted by the monitor server 131 according to the first embodiment of this invention.

The query request includes types of requested information. The query request of FIG. 8 requests a traffic information identifier (RECORD_ID), a source IP address (IPV4_SRC_ADDR), a destination IP address (IPV4_DST_ADDR), and a byte count in a communication flow (IN_BYTES).

Further, the query request includes an aggregation identifier (AGGR_ID) as a retrieval condition. The query request of FIG. 8 is issued to request retrieval of traffic information whose aggregation identifier is "1".

Upon reception of a query request, the traffic information aggregating apparatus 121 extracts the aggregation identifier from the query request. The traffic information aggregating apparatus 121 specifies traffic information corresponding to the aggregated information identified by the extracted aggregation identifier, and transmits the specified traffic information to the monitor server 131 as a query result.

To be specific, the traffic information aggregating apparatus 121 selects, from the traffic information table 307, records whose aggregation identifiers 3075 of the traffic information table 307 coincide with the extracted aggregation identifier. The traffic information aggregating apparatus 121 extracts, from each of the chosen records, the traffic information identifier 3071, the source IP address 3072, the destination IP address 3073, and the byte count 3074. The traffic information aggregating apparatus 121 transmits the extracted traffic information identifier 3071, source IP address 3072, destination IP address 3073, and byte count 3074 to the monitor server 131 as a query result.

A conventional traffic information aggregating apparatus retrieves traffic information by using a source IP address and a destination IP address as retrieval keys. In other words, the conventional traffic information aggregating apparatus has to search the plural columns. On the other hand, the traffic information aggregating apparatus 121 of this embodiment retrieves traffic information by using an aggregation identifier as a retrieval key. Thus, in this embodiment, the load of retrieval processing on the traffic information aggregating apparatus 121 can be reduced.

When the IP address is an IPv4 address, the length of a retrieval key is 64 bits. When the IP address is an IPv6 address, the length of a retrieval key is 256 bits. On the other hand, in this embodiment, the length of a retrieval key is several bits. In other words, according to this embodiment, the length of a retrieval key is short, so the load of retrieval processing on the traffic information aggregating apparatus 121 can be further reduced.

Figure 9:
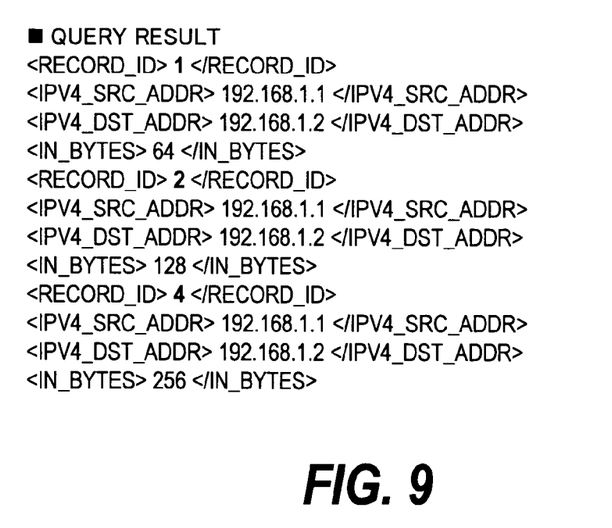
FIG. 9 is an explanatory diagram of a query result transmitted by the traffic information aggregating apparatus according to the first embodiment of this invention.

FIG. 9 is an explanatory diagram of a query result transmitted by the traffic information aggregating apparatus 121 according to the first embodiment of this invention.

The query result contains all traffic information corresponding to the query request. To be specific, the query result contains, for each piece of traffic information corresponding to the query request, a traffic information identifier (RECORD_ID), a source IP address (IPV4_SRC_ADDR), destination IP address (IPV4_DST_ADDR), and a byte count in the communication flow (IN_BYTES).

As described above, in the first embodiment of this invention, the traffic information aggregating apparatus 121 assigns an aggregation identifier to traffic information, and performs aggregation processing by using the aggregation identifier. The monitor server 131 specifies an aggregation identifier as a retrieval key. Then, the traffic information aggregating apparatus 121 performs retrieval processing by using the specified aggregation identifier. In other words, the traffic information aggregating apparatus 121 can perform aggregation processing and retrieval processing based on the aggregation identifier.

Second Embodiment

In a second embodiment of this invention, the traffic information aggregating apparatus 121 aggregates traffic information based on a destination IP address and a destination port number.

A configuration of a traffic information monitoring system of the second embodiment is the same as that of the traffic information monitoring system of the first embodiment shown in FIG. 1, so a description thereof is omitted. Further, an outline of processing in the traffic information monitoring system of the second embodiment is the same as that in the traffic information monitoring system of the first embodiment shown in FIG. 4, so a description thereof is omitted.

Figure 10:
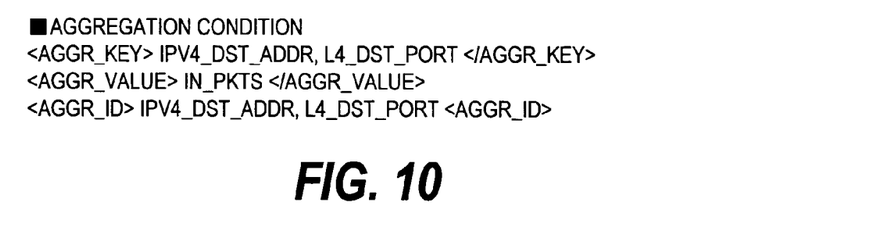
FIG. 10 is an explanatory diagram of an aggregation condition transmitted by the monitor server according to the second embodiment of this invention.

FIG. 10 is an explanatory diagram of an aggregation condition transmitted by the monitor server 131 according to the second embodiment of this invention.

The aggregation condition includes an aggregation key (AGGR_KEY), a value to be aggregated (AGGR_VALUE), and a type of an aggregation identifier (AGGR_ID_TYPE).

In the aggregation condition of the second embodiment, the aggregation key is a combination of a destination IP address (IPV4_DST_ADDR) and a destination port number (L4_DST_PORT), and the value to be aggregated is a packet count in a communication flow (IN_PKTS).

The type of an aggregation identifier is a combination of a destination IP address (IPV4_DST_ADDR) and a destination port number (L4_DST_PORT).

Figure 11:
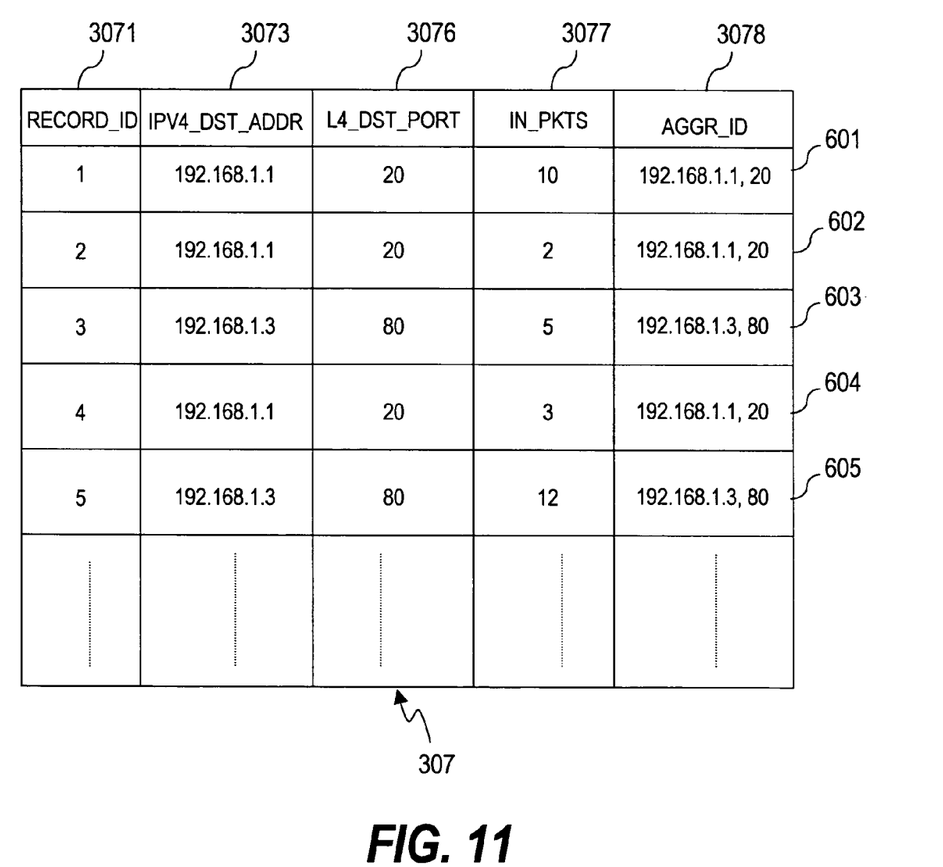
FIG. 11 is a configuration diagram of the traffic information table according to the second embodiment of this invention.

After receiving the aggregation condition of FIG. 10, the traffic information aggregating apparatus 121 stores traffic information in a traffic information table 307 based on the received aggregation condition.

FIG. 11 is a configuration diagram of the traffic information table 307 according to the second embodiment of this invention.

The traffic information table 307 contains the traffic information identifier (RECORD_ID) 3071, the destination IP address (IPV4_DST_ADDR) 3073, a destination port number (L4_DST_PORT) 3076, a packet count (IN_PKTS) 3077, and an aggregation identifier (AGGR_ID) 3078.

The traffic information identifier 3071 is a unique identifier of traffic information. The destination IP address 3073 is an IP address of the destination of the communication flow corresponding to the traffic information identified by the traffic information identifier 3071 of the record. The destination port number 3076 is a port number of the destination of the communication flow corresponding to the traffic information identified by the traffic information identifier 3071 of the record.

The packet count 3077 is the count of packets transmitted in the communication flow corresponding to the traffic information identified by the traffic information identifier 3071 of the record. The aggregation identifier 3078 is a unique identifier of aggregated information corresponding to the traffic information identified by the traffic information identifier 3071 of the record. The aggregation identifier 3078 is used when the traffic information aggregating apparatus 121 aggregates traffic information, and is also used when the traffic information aggregating apparatus 121 retrieves traffic information.

In the second embodiment, the monitor server 131 specifies a combination of a destination IP address (IPV4_DST_ADDR) and a destination port number (L4_DST_PORT) as a type of an aggregation identifier. The traffic information aggregating apparatus 121 then stores the combination of the destination IP address and the destination port number in the communication flow corresponding to traffic information, in the aggregation identifier 3078.

Figure 12:
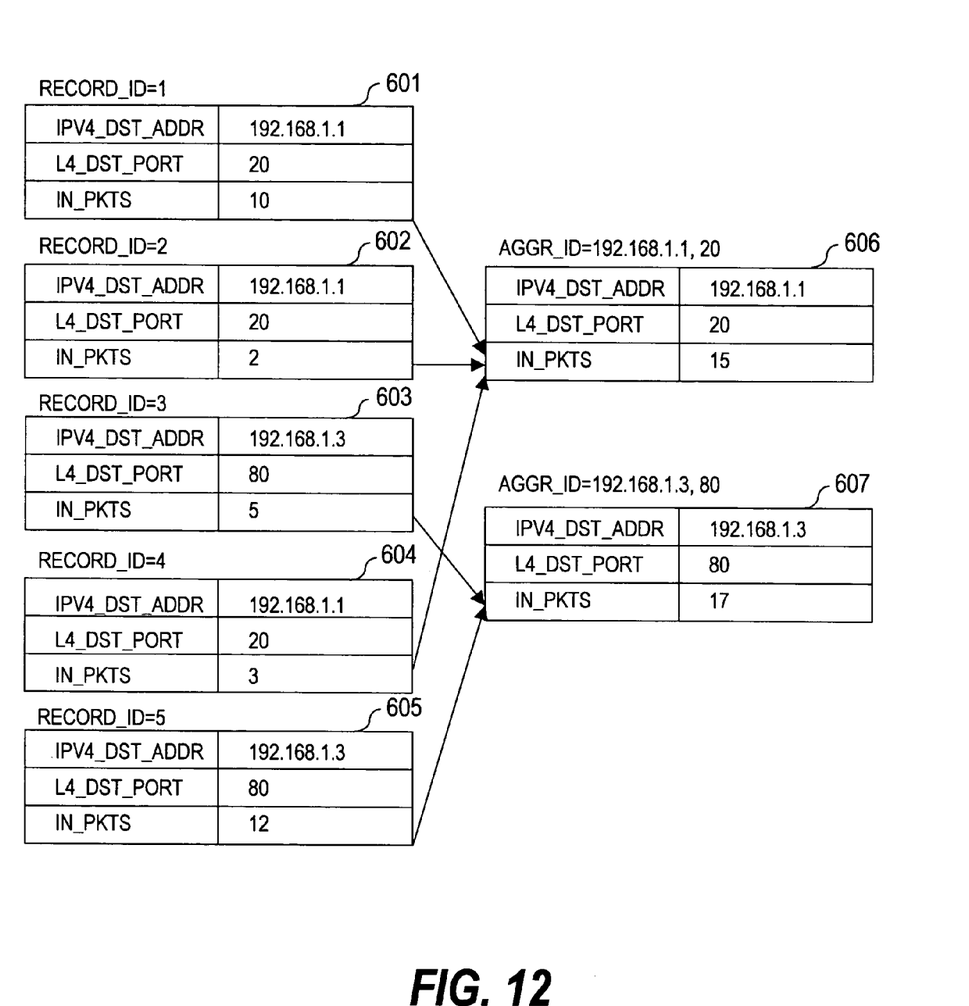
FIG. 12 is an explanatory diagram of aggregation processing performed by the traffic information aggregating apparatus according to the second embodiment of this invention.

FIG. 12 is an explanatory diagram of aggregation processing performed by the traffic information aggregating apparatus 121 according to the second embodiment of this invention.

A description is given of a case of the aggregation condition shown in FIG. 10.

The traffic information aggregating apparatus 121 aggregates traffic information on communication flows that have the same combination of a destination IP address and a destination port number.

To be specific, the traffic information aggregating apparatus 121 selects records that have the same combination of the destination IP address 3073 and the destination port number 3076 of the traffic information table 307 shown in FIG. 11. The traffic information aggregating apparatus 121 assigns an identical aggregation identifier to the traffic information corresponding to the chosen records. The traffic information aggregating apparatus 121 creates aggregated information by aggregating the traffic information to which the identical aggregation identifier is assigned.

For example, the traffic information aggregating apparatus 121 selects, from the traffic information table 307 shown in FIG. 11, a record 601 identified by "1" of the traffic information identifier 3071, a record 602 identified by "2" of the traffic information identifier 3071, and a record 604 identified by "4" of the traffic information identifier 3071, because the traffic information corresponding to the records 601, 602, and 604 have the same combination of the destination IP address 3073 and the destination port number 3076.

The traffic information aggregating apparatus 121 assigns "192.168.1.1, 20" as an aggregation identifier to the traffic information corresponding to the record 601, the traffic information corresponding to the record 602, and the traffic information corresponding to the record 604. The traffic information aggregating apparatus 121 stores the assigned aggregation identifier "192.168.1.1, 20" in the aggregation identifiers 3078 of the records 601, 602, and 604.

The traffic information aggregating apparatus 121 creates aggregated information 606 by calculating the total of the packet counts 3077 of all the chosen records 601, 602, and 604.

In a similar manner, the traffic information aggregating apparatus 121 selects, from the traffic information table 307, a record 603 identified by "3" of the traffic information identifier 3071 and a record 605 identified by "5" of the traffic information identifier 3071, because the traffic information corresponding to the records 603 and 605 have the same combination of the destination IP address 3073 and the destination port number 3076.

The traffic information aggregating apparatus 121 assigns "192.168.1.3, 80" as an aggregation identifier to the traffic information corresponding to the record 603 and the traffic information corresponding to the record 605. The traffic information aggregating apparatus 121 stores the assigned aggregation identifier "192.168.1.3, 80" in the aggregation identifiers 3078 of the records 603 and 605.

The traffic information aggregating apparatus 121 creates aggregated information 607 by calculating the total of the packet counts 3077 of all the chosen records 603 and 605.

Figure 13:
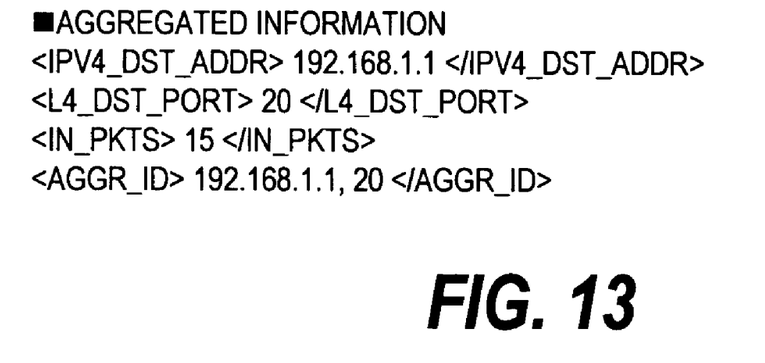
FIG. 13 is an explanatory diagram of aggregated information transmitted by the traffic information aggregating apparatus according to the second embodiment of this invention.

FIG. 13 is an explanatory diagram of aggregated information transmitted by the traffic information aggregating apparatus 121 according to the second embodiment of this invention.

The aggregated information includes a destination IP address (IPV4_DST_ADDR), a destination port number (L4_DST_PORT), the total of packet counts in the communication flows (IN_PKTS), and an aggregation identifier (AGGR_ID).

The destination IP address included in the aggregated information is an IP address of the destination of the communication flow corresponding to the aggregated information. The destination port number included in the aggregated information is a port number of the destination of the communication flow corresponding to the aggregated information. The total of packet counts in the communication flows included in the aggregated information is the total count of packets transmitted in the communication flows corresponding to the aggregated information. The aggregation identifier is a unique identifier of the aggregated information.

In the aggregated information of FIG. 13, the destination IP address is "192.168.1.1", the destination port number is "20", the total count of packets in communication flows is "15", and the aggregation identifier is "192.168.1.1, 20".

Figure 14:
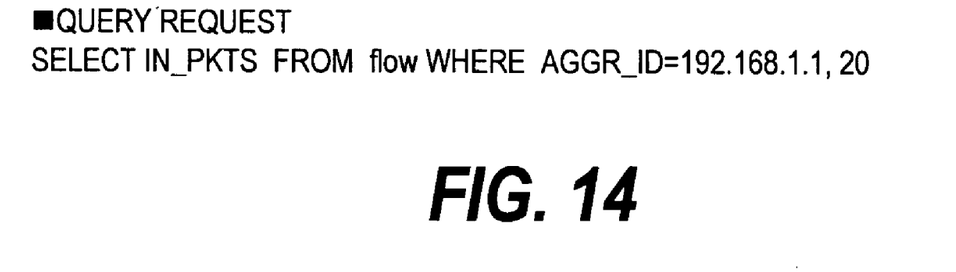
FIG. 14 is an explanatory diagram of a query request transmitted by the monitor server according to the second embodiment of this invention.

FIG. 14 is an explanatory diagram of a query request transmitted by the monitor server 131 according to the second embodiment of this invention.

The query request includes types of requested information. The query request of FIG. 14 requests a packet count in a communication flow (IN_PKTS).

Further, the query request includes an aggregation identifier (AGGR_ID) as a retrieval condition. The query request of FIG. 14 is issued to request retrieval of traffic information whose aggregation identifier is "192.168.1.1, 20".

Upon reception of a query request, the traffic information aggregating apparatus 121 extracts the aggregation identifier from the query request. The traffic information aggregating apparatus 121 specifies traffic information corresponding to the aggregated information identified by the extracted aggregation identifier, and transmits the specified traffic information to the monitor server 131 as a query result.

To be specific, the traffic information aggregating apparatus 121 selects, from the traffic information table 307, records whose aggregation identifiers 3078 of the traffic information table 307 coincide with the extracted aggregation identifier. The traffic information aggregating apparatus 121 extracts, from each of the chosen records, the traffic information identifier 3071 and the packet count 3077. The traffic information aggregating apparatus 121 transmits the extracted traffic information identifier 3071 and packet count 3077 to the monitor server 131 as a query result.

Figure 15:
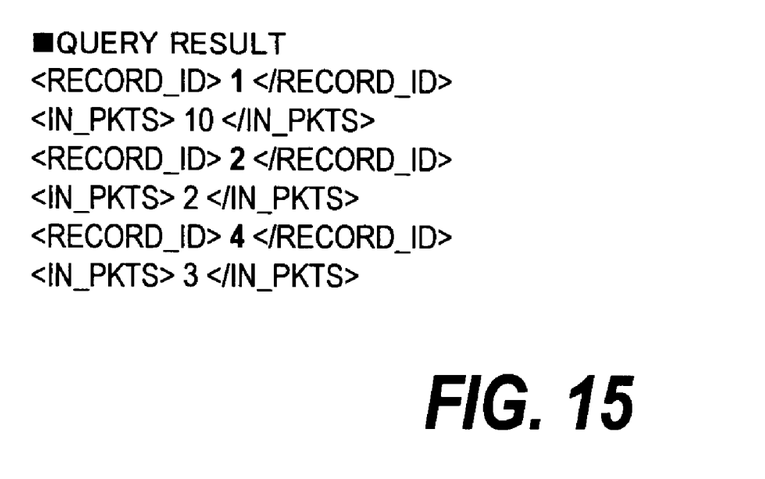
FIG. 15 is an explanatory diagram of a query result transmitted by the traffic information aggregating apparatus according to the second embodiment of this invention.

FIG. 15 is an explanatory diagram of a query result transmitted by the traffic information aggregating apparatus 121 according to the second embodiment of this invention.

The query result contains all traffic information corresponding to the query request. To be specific, the query result contains, for each piece of traffic information corresponding to the query request, a traffic information identifier (RECORD_ID) and a packet count in a communication flow (IN_PKTS).

While the present invention has been described in detail and pictorially in the accompanying drawings, the present invention is not limited to such detail but covers various obvious modifications and equivalent arrangements, which fall within the purview of the appended claims.

What is claimed is:

1. A network system, comprising:
a router for transferring data in a network;
a traffic information aggregating apparatus connected to the router,
the traffic information aggregating apparatus comprising:
a first processor;
a first memory; and
a first interface; and
a monitor server connected to the traffic information aggregating apparatus,
the monitor server comprising:
a second processor;
a second memory; and
a second interface,
wherein the monitor server transmits a condition to aggregate traffic information, and
wherein the traffic information aggregating apparatus is configured to:
receive and store traffic information from the router,
assign an aggregation identifier to the received traffic information based on the condition to aggregate traffic information received from the monitor server,
create aggregated information by aggregating the received traffic information based on the assigned aggregation identifier, and
transmit the created aggregated information and the assigned aggregation identifier to the monitor server,
wherein the monitor server is configured to:
identify an aggregation identifier for which the monitor server should receive traffic information, and transmit a retrieval request including the aggregation identifier, designated from the received aggregated information, wherein the traffic information aggregating apparatus is further configured to:
receive the retrieval request from the monitor server designating the aggregation identifier,
retrieve requested traffic information from the received traffic information, based on the aggregation identifier designated in the received retrieval request, and
transmit the retrieved traffic information to the monitor server, and
wherein the monitor server instructs the traffic information aggregating apparatus of an aggregation identifier assignment method; and
the traffic information aggregating apparatus is further configured to assign the aggregation identifier to the received traffic information by using the instructed aggregation identifier assignment method.

2. The network system according to claim 1, wherein the traffic information aggregating apparatus is further configured to assign the aggregation identifier to the received traffic information by referring to at least one of a source IP address, a destination IP address, a source port number, and a destination port number in a communication flow corresponding to the received traffic information.

3. The network system according to claim 1, wherein the traffic information aggregating apparatus is further configured to create the aggregated information by aggregating the traffic information received in a predetermined period of time.

4. The network system according to claim 1, wherein the monitor server further instructs the traffic information aggregating apparatus to follow one of a method of assigning the aggregation identifier in ascending order and a method of assigning a combination of an IP address and a port number as the aggregation identifier.

5. The network system according to claim 1, wherein the traffic information aggregating apparatus is included in the router.

6. The network system according to claim 1, wherein the traffic information aggregating apparatus stores a traffic information table indicating a correspondence between a traffic information identifier serving as a unique identifier of the traffic information and the aggregation identifier assigned to the traffic information, and retrieves the requested traffic information from the received traffic information by referring to the traffic information table.

7. A traffic information aggregating apparatus connected to a router and a monitor server, comprising:
a processor;
a memory; and an interface, wherein the monitor server transmits a condition to aggregate traffic information, wherein the processor is configured to:
  receive and store traffic information from the router,
  assign an aggregation identifier to the received traffic information based on the received condition,
  create aggregated information by aggregating the received traffic information based on the assigned aggregation identifier, and
  transmit the created aggregated information and the assigned aggregation identifier to the monitor server, and wherein the monitor server is configured to:
  identify an aggregation identifier for which the monitor server should receive traffic information and transmit a retrieval request including the aggregation identifier, designated from the received aggregated information, and wherein the processor is further configured to:
  receive the retrieval request from the monitor server designating the aggregation identifier,
  retrieve requested traffic information from the received traffic information, based on the aggregation identifier designated in the received retrieval request,
  transmit the retrieved traffic information to the monitor server, and assign the aggregation identifier to the traffic information by using an aggregation identifier assignment method instructed by the monitor server.

8. The traffic information aggregating apparatus according to claim 7, wherein the processor is further configured to assign the aggregation identifier to the received traffic information by referring to at least one of a source IP address, a destination IP address, a source port number, and a destination port number in a communication flow corresponding to the traffic information.

9. The traffic information aggregating apparatus according to claim 7, wherein the processor is further configured to create the aggregated information by aggregating the traffic information received in a predetermined period of time.

10. The traffic information aggregating apparatus according to claim 7, wherein the processor is further configured to assign the aggregation identifier to the traffic information by using one of a method of assigning the aggregation identifier in ascending order and a method of assigning a combination of an IP address and a port number as the aggregation identifier.

11. The traffic information aggregating apparatus according to claim 7, wherein the traffic information aggregating apparatus is included in the router.

12. The traffic information aggregating apparatus according to claim 7, wherein the processor stores in the memory a traffic information table indicating a correspondence between a traffic information identifier serving as a unique identifier of the traffic information and the aggregation identifier assigned to the traffic information, and retrieves the requested traffic information from the received traffic information by referring to the traffic information table.

* * * * *